(12) United States Patent
Bauer et al.

(10) Patent No.: US 6,345,080 B1
(45) Date of Patent: Feb. 5, 2002

(54) MEASUREMENT DEVICE FOR DETERMINING BORON CONCENTRATION

(75) Inventors: Horst Bauer, Erlangen; Klaus Nopitsch, Rednitzhembach; Eduard Gehring, Buckenhof, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/296,122

(22) Filed: Apr. 21, 1999

Related U.S. Application Data

(63) Continuation of application No. PCT/EP97/05810, filed on Oct. 21, 1997.

(30) Foreign Application Priority Data

Oct. 21, 1996  (DE) .......................... 196 43 375

(51) Int. Cl.⁷ .............................................. G21C 17/02
(52) U.S. Cl. ...................... 376/159; 376/158; 376/245; 250/390.1; 250/390.4; 250/390.5
(58) Field of Search ................................ 376/158, 159, 376/245; 250/390.01, 390.04, 390.05

(56) References Cited

U.S. PATENT DOCUMENTS

| | | | |
|---|---|---|---|
| 3,578,562 A | | 5/1971 | Johnson et al. ............... 176/22 |
| 3,597,613 A | | 8/1971 | Rajagopal .................. 250/83.1 |
| 3,786,256 A | * | 1/1974 | Untermyer ............. 250/71.5 R |
| 3,898,467 A | | 8/1975 | Schukei et al. ............. 250/390 |
| 4,081,683 A | * | 3/1978 | Csom et al. ................. 250/364 |
| 4,464,330 A | * | 8/1984 | Speir et al. .................. 376/159 |
| 4,565,926 A | * | 1/1986 | Crane .......................... 250/390 |
| 4,645,635 A | * | 2/1987 | Yuen et al. .................. 376/245 |
| 4,645,935 A | * | 2/1987 | Salaita ........................ 250/390 |

FOREIGN PATENT DOCUMENTS

| | | | |
|---|---|---|---|
| DD | 54744 | 3/1967 | |
| DD | 114461 | 8/1975 | |
| DE | 2511474 | 9/1975 | |
| DE | 2423992 | * 11/1975 | ............ G21C/7/22 |
| DE | 2645846 | 4/1977 | |
| DE | 2840569 | 3/1980 | |

OTHER PUBLICATIONS

Derwent Publication No. SU 602 045 (Volegov), dated Sep. 7, 1981.
Japanese Patent Abstract No. 02242197 (Sanemitsu), dated Sep. 26, 1990.
"Eine Messvorrichtung zur Überwachung der Borsäurekonzentration in Reaktoranlagen", K. Fahrmann et al., Kernenergie, $10^{th}$ edition, vol. 11, 1967, pp,. 357–340.
"Borkonzentrationsmessung im 1. Kreislauf von Druckwasserreaktoren", A. Zaoui et al., Kernenergie, $18^{th}$ edition, vol. 2, 1975, pp. 47–49.
"Eine verbesserte Messeinrichtung zur Überwachung der Borkonzentration in Reaktoranlagen", K. Fährmann et al., Kernenergie, $18^{th}$ edition, vol. 7, 1975.*

* cited by examiner

Primary Examiner—Michael J. Carone
Assistant Examiner—John Richardson
(74) Attorney, Agent, or Firm—Herbert L. Lerner; Laurence A. Greenberg; Werner H. Stemer

(57) ABSTRACT

The boron concentration can be measured without intervention into the cooling circuit of a nuclear power station. A mobile emitter and a mobile receiver are provided, with the interposition of at least one coolable region, for placement on a coolant-carrying component of the cooling circuit.

19 Claims, 2 Drawing Sheets

MEASUREMENT DEVICE FOR DETERMINING BORON CONCENTRATION

CROSS-REFERENCE TO RELATED APPLICATION

This is a continuation of copending International Application PCT/EP97/05810, filed Oct. 21, 1997, which designated the United States.

BACKGROUND OF THE INVENTION

FIELD OF THE INVENTION

The invention lies in the nuclear power generation field. Specifically, the invention relates to a measurement device for determining the boron concentration in the coolant of a cooling circuit of a nuclear power station.

Boron is used as a neutron absorber in the coolant of the cooling circuit of a nuclear power station. The boron serves to control and compensate for the consumption of the fuel rods since neutrons are absorbed, i.e. removed from the chain reaction, to a greater or lesser extent depending on the boron concentration. Irregularities in the power density distribution due to otherwise customary mechanical control components can therefore be avoided, with the result that performance can be improved. It is consequently necessary for the boron concentration in the coolant, in particular in the coolant of the primary circuit or in auxiliary circuits, to be monitored.

It has become known from the document "Kernenergie" [nuclear energy], vol. 11, 1967, p. 337–39, to determine the boric acid concentration with a method that involves measuring neutron absorption. The measurement device used there allows a determination of the boric acid concentration under normal operating conditions, i.e. up to an ambient temperature of 120° C. and a system pressure of 120 bar. Cooling circuits of nuclear power stations, however, and in particular the primary circuit, are often subject to temperatures of up to 380° C. with a system pressure of about 180 bar. Because of those system conditions, which are more severe than normal operating conditions, the measurement device described in the document is used in monitoring modules, at a sufficiently great distance from the cooling circuit.

In that that prior art measurement device, intervention in the cooling circuit is necessary. A bypass line branching off from the cooling circuit passes through the measurement device in order for the boric acid concentration to be determined. The use of a measurement device of that type, which is designed as a continuous-flow meter, is limited in terms of its mobility. The assembly is very expensive and leads to fairly long outages of the nuclear power station.

SUMMARY OF THE INVENTION

It is accordingly an object of the invention to provide a of the invention is therefore to provide a measurement device for determining the boron concentration in the coolant of a cooling circuit of a nuclear power station, which overcomes the above-mentioned disadvantages of the heretofore-known devices and methods of this general type and which makes it possible to measure the boron concentration without intervention in the cooling circuit and in a particularly simple way.

With the foregoing and other objects in view there is provided, in accordance with the invention, a measurement device for determining a boron concentration in a coolant conducted in a coolant-carrying component of a coolant loop of a nuclear power station. The device comprises a mobile emitter adapted to be disposed on the coolant-carrying component with a coolable space formed in between, and a mobile receiver adapted to be disposed on the coolant-carrying component with a further coolable spaced formed in between.

In other words, the invention provides for a mobile measurement device which includes a mobile emitter and a mobile receiver which are respectively placed, with the interposition of at least one coolable space, on the coolant-carrying component of the cooling circuit.

The basic concept of the invention is that, instead of a bypass line for a continuous-flow meter, part of the cooling circuit system itself can be used for the measurement. The measurement device is preferably constructed in such a way that it can be fastened directly on the cooling circuit. It is in this case particularly insensitive to temperature and radiation. In this regard, it may also be used under extreme ambient conditions.

In accordance with an added feature of the invention, the coolable space is formed in a cooling duct through which a coolant flows. The coolant is preferably air and its temperature can be predetermined.

In order to make it possible to protect the emitter and the receiver from high temperatures of the component, it is favorable if a cooling duct through which a coolant flows is arranged on the component at least in the respective region of the emitter and the receiver. For example, the cooling duct may be arranged in the space between the emitter and the component, and in the space between the receiver and the component. In the present context, the term component includes, by way of example, a tank, a boiler, a piece of piping or another vessel, possibly with large surface area, which carries or contains the coolant.

In order to guarantee simple and efficient cooling, i.e. maximally constant and reliable cooling of the emitter and of the receiver, air is the preferred coolant. To this end, the air or cooling air is blown through the cooling duct, for example using a fan. Further, the temperature of the cooling air can expediently be defined in advance. The temperature then defined in advance guarantees that the cooling air does not pass above or below a limit value. To this end, for example, it is possible to control the cooling air flow by means of the power of the fan. This guarantees that all parts of the measuring instrument are protected against overheating.

The one or two regions of the emitter and the receiver also advantageously have an insulation layer which is arranged, for example, directly on the component of the coolant circuit. In the insulation layer, air is for example used as insulator. The emitter and the receiver are preferably respectively arranged in an associated chamber. This provides spatial separation, by means of which the emitter and the receiver are respectively accommodated while being protected against excessive temperature.

The boron concentration is best measured by measuring a degree of neutron absorption in the medium. For that purpose, a neutron source is used as the emitter and at least one counter tube is used as the receiver. For reasons of the radiation from the neutron source, and because of effects on the measurement by external factors, for example moisture, a shield is provided. The shield may be a common shield or individual shields for the neutron source and the counter tube. The shield expediently comprises a first layer of an absorbing moderator and a second layer of neutron-absorbing material, e.g. cadmium sheeting, as well as a third layer of austenitic material, e.g. steel sheeting.

By means of the absorbing moderator, e.g. polyethylene moderator, the neutron flux produced by the emitter is slowed and partly reflected. Low radiation exposure for the operating personnel is therefore guaranteed, in particular through the use of the absorbing moderator and the cadmium sheeting.

In accordance with another feature of the invention, the emitter and the receiver are arranged in a casing made of one or more parts, in particular two parts. To this end, for example, the emitter may be arranged in a first casing part and the receiver in a second casing part.

In order to make it possible to fasten the emitter and the receiver particularly straightforwardly and reliably on the component or the line segment of the coolant loop, at least the emitter and the receiver can be fastened using at least one fastening means on the component or on the line segment. To this end, for example, the two casing parts may be placed so that they engage on the line section and may be screwed together using the fastening means. In the case of components with large surface area, fastening may take place, for example, via support devices. On no occasion is the component from which measurements are taken damaged or compromised. Neither structural measures nor interventions on the component are therefore necessary.

Due to the fact that the measuring method involving neutron absorption is decisively dependent on the consistency of the measurement geometry, a number of spacers are provided such that the length of the measurement path between the emitter and the receiver is approximately constant even in the event of a change in the ambient conditions. This is applicable, of course, for a straight-line measurement path or a measurement path in which there is at least one reflection point. Spacers of this type, for example support devices, are expediently designed so as to be resistant to temperature and expansion. The term expansion-resistant as used in this context means that the material of the spacer has a small or negligible coefficient of thermal expansion within the relevant temperature range.

In accordance with again another feature of the invention, the emitter and the receiver are arranged at least approximately opposite one another on the component. This forms a straight-line direct measurement path. The straight-line path is favorable for components with relatively small structural dimensions. As an alternative, the emitter and the receiver may be arranged on the component in such a way that the measurement signal received by the receiver is essentially a reflection of the emitter signal, i.e., it is a reflected measurement signal. This design is appropriate, in particular, for components with large volume. It will be understood that the signal output by the emitter may be reflected one or more times.

In order to make it possible to represent the value of the boron concentration as a function of time independently of effects due to pressure, temperature and radiation, at least the receiver is connected to an evaluation unit. With the aid of model-based plausibility and balancing algorithms, it is possible to eliminate spurious effects so that an accurate representation of the measured values of the boron concentration in the medium is guaranteed.

The advantages achieved with the invention consist, in particular, in that, owing to the simple construction of the measurement device, in particular because of the mobility of the emitter and the receiver, no intervention in the cooling circuit of the nuclear power station is needed in order to determine the boron concentration. Further, the measurement device is configured by means of the coolable region such that it is suitable for use under extreme system conditions or operating conditions, for example up to operating temperatures of 380° C. The measurement device is therefore suitable in particular for mobile use as well as for retrofitting existing stations.

Other features which are considered as characteristic for the invention are set forth in the appended claims.

Although the invention is illustrated and described herein as embodied in a boron meter, i.e., a measurement device for determining boron concentration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Corresponding parts are identified with the same reference numbers in the two figures.

DESCRIPTION OF THE PREFERRED EMBODIMENTS

Figure 1:
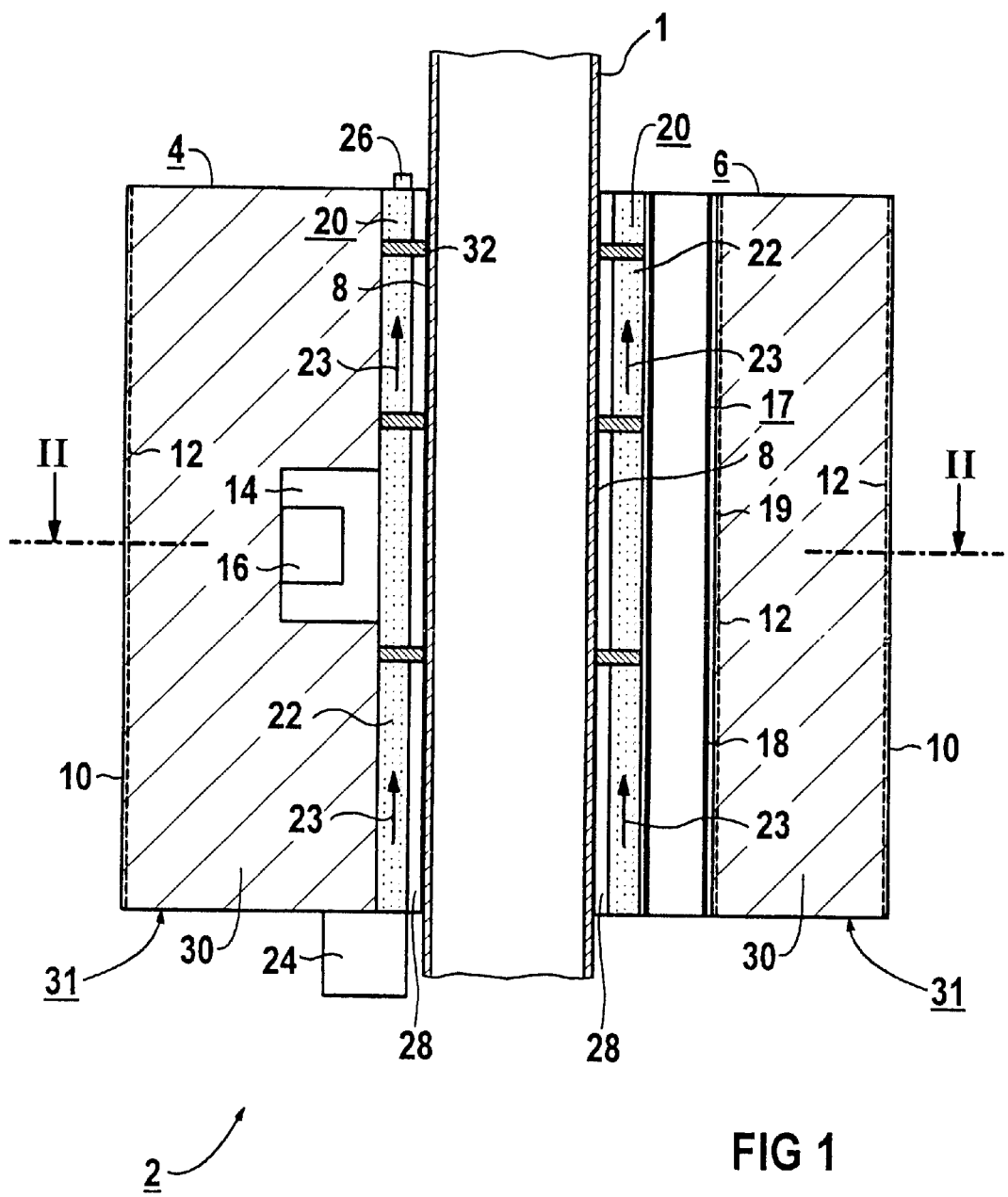
FIG. 1 is a schematic, longitudinal sectional view of the measurement device for measuring boron concentration.

Referring now to the figures of the drawing in detail and first, particularly, to FIG. 1 thereof, there is seen a measurement device 2, or measuring cell, arranged around a component, a line segment or medium tube 1. The measurement device forms a part of a nuclear power station. The medium tube 1 forms a part of a coolant loop, for example of a primary circuit system.

The measurement device 2 comprises a first concave casing part 4 and a second concave casing part 6. The respective inner wall 8 and the respective outer wall 10 of the first casing part 4 and the second casing part 6 preferably consist of austenitic steel. A cadmium screen 12 in the form of cadmium sheeting is fitted on the respective inner sides of the outer walls 10 in order to stop thermal neutrons.

A source chamber 14 is provided in the first casing part 4 to accommodate a neutron source 16 which serves as the emitter. A counter-tube chamber 17 is arranged in the second casing part 6 to accommodate two parallel counter tubes 18 which serve as the receiver. The wall 19 of the counter-tube chamber 17 lying toward the outer wall 10 also has a cadmium screen 12. Embodiments having a plurality of emitters and/or receivers are also possible, and may for example be used to pick up concentration drops or signal differences.

In order to protect the neutron source 16 and the counter tubes 18 against high temperatures of the medium tube 1, a cooling duct 20 is arranged between the source chamber 14 and the inner wall 8, or between the counter-tube chamber 17 and the inner wall 8. The length of the cooling duct 20 in the vertical direction corresponds to at least the length of the measurement device 2. Depending on the embodiment of the medium tube 1, the cooling duct 20 may, for example, be annular or elongate in design.

Coolant 22 flows through the cooling duct 20 in the direction of the arrows 23. The coolant 22, for example air, is propelled through the cooling duct 20 by means of a fan 24. The fan 24 is, for example, arranged at the lower end of the first casing part 4. A temperature sensor 26 for determining the temperature of the coolant 22 is arranged at the opposite end of the first casing part 4. A signal representing the measured value determined by the temperature sensor 26 is fed to a non-illustrated temperature control system. The temperature control system guarantees that the temperature of the coolant 22 does not exceed an upper threshold or fall below a lower threshold. To this end, the power of the fan 24 and the resulting flow of cooling air are controlled.

If appropriate, the first casing part 4 and the second casing part 6 also comprise, between the inner wall 8 and the cooling duct 20, an insulation layer 28 in addition to the cooling duct 20. Air is used as the insulator. Similar to the cooling duct 20, the insulation layer 28 may, for example, be of annular or elongate design.

The gap formed between the inner wall 8 and the outer wall 10 of the first casing part 4 is filled with an absorbing moderator 30. Polyethylene is thereby used as the absorbing moderator 30. Similarly, the gap in the second casing part 6 is also filled with absorbing moderator 30. The absorbing moderator 30, the cadmium screen 12 consisting of neutron-absorbing material, and the outer wall 10 consisting of austenitic material form a layered shield 31 against the radiation produced by the neutron source 16.

Spacers 32 that are resistant to temperature and that do not expand, are incorporated in the radial direction in the insulation layer 28 and in the cooling duct 20. The spacers 32, for example support devices, serve to prevent a thermally induced change in the measurement geometry, in particular the length of the measurement path. For example, ceramic or mica glass is used as the material resistant to temperature and expansion.

Figure 2:
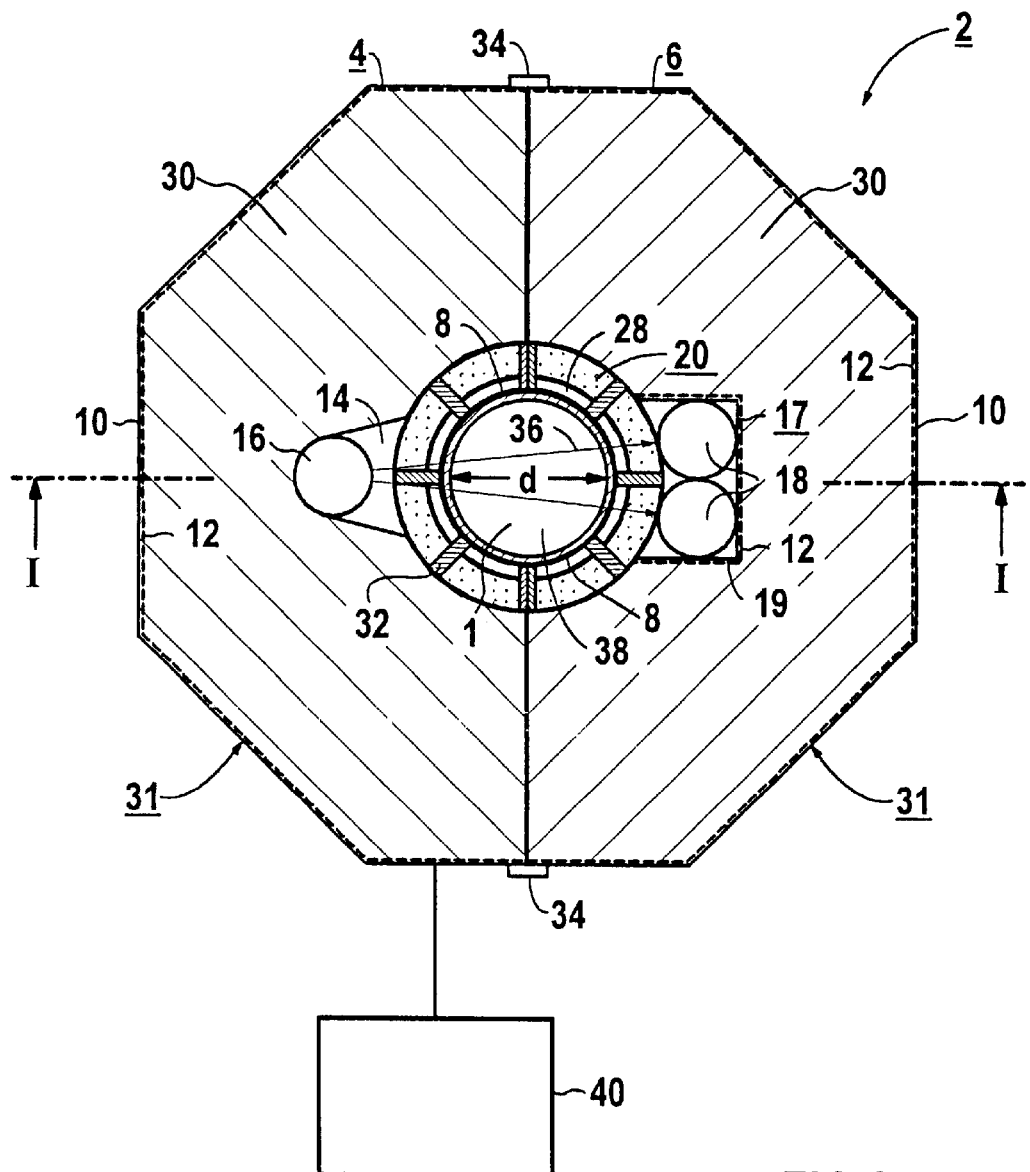
FIG. 2 is a schematic cross section of the measurement device taken along the line II—II in FIG. 1.

FIG. 2 shows the measurement device 2 in cross section. The first casing part 4 and the second casing part 6 are connected to one another by means of a number of externally fitted fastening elements 34. In this regard, the measurement device as a whole encloses or clamps the medium tube 1. The fastening elements 34 are, for example, designed as clips, screws or clamping devices. From this view it can be seen that two counter tubes 18 are again provided; it is also possible for more than two counter tubes to be provided. The neutron source 16 and the two counter tubes 18 are arranged in the source chamber 14 and in the counter-tube chamber 17, respectively.

In order to cool the neutron source 16 and the two counter tubes 18, the insulation layer 28 and the cooling duct 20 run concentrically around the medium tube 1. Further, the spacers 32 are fitted at regular intervals in the insulation layer 28 and the cooling duct 20. Similarly to FIG. 1, the outer walls 10 and the wall 19 of the counter-tube chamber 17 respectively have a cadmium screen 12.

Using the neutron source 16, a neutron flux 36 is sent through the coolant 38 flowing in the medium tube 1. The neutron flux 36 passes through the boron-enriched coolant 38. The neutron flux 36 is attenuated in dependence on the boron concentration in the coolant 38. The altered neutron flux 36 is determined by means of the neutron detectors, i.e. the counter tubes 18.

Signals representing the measured values formed by the counter tubes 18 are transmitted to an evaluation unit 40. From the count rate and the temperature of the coolant 38 (the measuring sensor is not illustrated for reasons of clarity), the evaluation unit 40 determines the concentration of boron or boric acid. Since the neutron source 16 is arranged diagonally opposite the two counter tubes 18, the neutron flux 36 passes through the coolant 38 over the entire width of the diameter d of the medium tube 1. Accordingly, a substantially straight-line measurement path is formed between the neutron source 16 and the counter tubes 18 in the medium tube 1.

Because of its highly effective, active thermal insulation using the controllable cooling air flow in the cooling duct 6, the described measurement device 2 exhibits good behavior in terms of thermal influences when determining the boron concentration. The measurement device 2 is therefore suitable, in particular, for direct use on the primary loop of a reactor plant, where temperatures of up to 380° C. may occur. The measurement device 2 is mechanically constructed in such a way that even strong temperature fluctuations do not cause any geometrical changes, and therefore do not have any effects on the measuring method.

Any possible remaining dependency of the method involving the measurement of neutron absorption on the thermodynamic state of the coolant 38 and the hydraulic system procedure in the primary cooling circuit can be eliminated by computer-assisted evaluation methods in the evaluation unit 40. In order to improve accuracy and obtain a fast display, further process information relevant to the measurement of the boron concentration is thereby also used in addition to the measurement signal from the measurement device 2. This information is processed in the evaluation unit 40 by using model-based plausibility and balancing algorithms. In addition, the radiation-screening construction of the measurement device 2 precludes significant exposure of the operating personnel to radiation.

It will be understood that in the context of large-surface components 2 it is possible to use a similar measurement device 2 but with the neutron source 16 and the counter tubes 18 arranged in a one-piece casing. In the case of such a device, it is favorable to use a reflection measurement signal. In this case, the signal put out by the neutron source 16 is reflected inside the component 1 and then picked up by the counter tubes 18.

We claim:

1. A measurement device for determining a boron concentration in a nuclear power station, comprising:

an emitter to be disposed on a boron-carrying component with a coolable space with a cooling duct through which a coolant flows formed in between said emitter and said boron-carrying component; and a receiver to be disposed on said boron-carrying component with a coolable space with a cooling duct through which said coolant flows, formed in between said receiver and said boron-carrying component;

spacers formed of a temperature-resistant and expansion-resistant material, said spacers maintaining a length of a measurement path between said emitter and said receiver substantially constant even in the event of a change in ambient conditions.

2. The measurement device according to claim 1, wherein said emitter and said receiver are held on said boron-carrying component by at least one fastener so as to require no structural measures or interventions on said boron-carrying component.

3. The measurement device according to claim 1, wherein said coolant is air.

4. The measurement device according to claim 1, wherein said coolant has a predetermined temperature.

5. The measurement device according to claim 1, which further comprises an additional insulation layer in said coolable space.

6. The measurement device according to claim 1, wherein each of said emitter and said receiver are disposed in a respective chamber.

7. The measurement device according to claim 1, wherein said emitter is a neutron source.

8. The measurement device according to claim 1, wherein said receiver is at least one counter tube.

9. The measurement device according to claim 1, which further comprises a shield respectively enclosing said emitter and said receiver.

10. The measurement device according to claim 9, wherein said shield includes a first layer of an absorbing moderator.

11. The measurement device according to claim 10, wherein said shield includes a second layer of neutron-absorbing material.

12. The measurement device according to claim 11, wherein said shield includes a third layer of austenitic material.

13. The measurement device according to claim 9, wherein said shield includes a layer of austenitic material.

14. The measurement device according to claim 1, which further comprises a casing housing said emitter and said receiver.

15. The measurement device according to claim 14, wherein said casing is formed in two parts.

16. The measurement device according to claim 1, which comprises at least one fastener for fastening said emitter and said receiver to the component.

17. The measurement device according to claim 1, which further comprises an evaluation device connected to said receiver.

18. The measurement device according to claim 1, wherein said emitter and said receiver are disposed substantially opposite one another on the component.

19. The measurement device according to claim 1, wherein said emitter and said receiver are disposed on the component such that a measurement signal received by said receiver is substantially a reflected measurement signal.

* * * * *